(12) United States Patent
Muramatsu et al.

(10) Patent No.: US 8,837,078 B2
(45) Date of Patent: Sep. 16, 2014

(54) ROTATING BODY FOR FLUID DYNAMIC BEARING CAPABLE OF BEING THINNED AND BEING IMPROVED IN ROTATIONAL ACCURACY AND METHOD OF PRODUCING THE ROTATING BODY FOR FLUID DYNAMIC BEARING

(75) Inventors: Akira Muramatsu, Shizuoka (JP); Takuji Yamada, Shizuoka (JP)

(73) Assignee: Samsung Electro-Mechanics Japan Advanced Technology Co., Ltd, Shizuoka (JP)

( * ) Notice: Subject to any disclaimer, the term of this patent is extended or adjusted under 35 U.S.C. 154(b) by 314 days.

(21) Appl. No.: 13/196,597

(22) Filed: Aug. 2, 2011

(65) Prior Publication Data

US 2012/0033324 A1    Feb. 9, 2012

(30) Foreign Application Priority Data

Aug. 3, 2010 (JP) ................. 2010-174742

(51) Int. Cl.
*G11B 17/02* (2006.01)
*G11B 19/20* (2006.01)

(52) U.S. Cl.
CPC .................. *G11B 19/2009* (2013.01)
USPC ..................... 360/99.08; 360/99.12

(58) Field of Classification Search
USPC ........................... 360/99.08, 99.12
See application file for complete search history.

(56) References Cited

U.S. PATENT DOCUMENTS

| 6,888,278 | B2 * | 5/2005 | Nishimura et al. | 310/90 |
| 2005/0058374 | A1 * | 3/2005 | Gomyo et al. | 384/119 |
| 2007/0133123 | A1 * | 6/2007 | Ichizaki | 360/99.05 |
| 2009/0284866 | A1 * | 11/2009 | Ito et al. | 360/99.08 |

FOREIGN PATENT DOCUMENTS

| JP | 2006038211 A | 2/2006 |
| JP | 2006234161 A | 9/2006 |
| JP | 2007-198555 | 9/2007 |

* cited by examiner

*Primary Examiner* — Wayne Young
*Assistant Examiner* — Carlos E Garcia (57) ABSTRACT

A rotating body for a fluid dynamic bearing used for rotating a recording disk that has been mounted therein include: a rotating shaft portion in which a cylindrical portion that serves as a rotating shaft and a protruding portion extended radially outward from one end of the cylindrical portion are formed integrally with each other; and a hub that is to be connected to the end portion near to the outer circumference of the protruding portion and that has a mounting seat portion on which the recording disk is to be mounted.

15 Claims, 8 Drawing Sheets

ROTATING BODY FOR FLUID DYNAMIC
BEARING CAPABLE OF BEING THINNED
AND BEING IMPROVED IN ROTATIONAL
ACCURACY AND METHOD OF PRODUCING
THE ROTATING BODY FOR FLUID
DYNAMIC BEARING

CROSS-REFERENCES TO RELATED
APPLICATIONS

This application is based upon and claims the benefit of priority from the prior Japanese Patent Application No. 2010-174742 filed Aug. 3, 2010 entire content of which is incorporated herein by reference.

BACKGROUND

1. Field of the Invention

The present invention relates to a rotating body for a fluid dynamic bearing and a method of producing the rotating body for a fluid dynamic bearing, and in particular, to a technique in which the rotational accuracy of a rotating body can be secured while the rotating body is thinned.

2. Description of the Related Art

Electronic apparatuses recently deal with a huge amount of data, and accordingly rotating devices, such as hard disk drives (HDDs), are widely mounted therein as recording apparatuses. In a rotating device mounted in such an electronic apparatus, read/write of a huge amount of data is achieved by stably rotating a recording disk at high-speed. In order to make it possible, it is needed to stably rotate a rotating body in which the recording disk is mounted at high-speed. As the bearings by which high-speed rotation of a rotating body is made possible, fluid dynamic bearings are widely adopted. For example, in the fluid dynamic bearing disclosed in Japanese Patent Application Publication No. 2007-198555, the space between a sleeve of which part of a stator is composed and a shaft of which part of a rotating body is composed is filled with lubricant, thereby allowing smooth high-speed rotation of the rotating body to be achieved by the sleeve and the shaft being rotated in a substantially non-contact state with each other. Main parts of a rotating body in a rotating device in which a fluid dynamic bearing is adopted are a shaft that serves as a rotating shaft and a hub in which a recording disk is to be mounted. It is general that the shaft and the hub are produced as separate parts, taking into consideration a reduction in production cost and easy production thereof, and they are joined together by a method of press-fitting and adhesion, etc., in an assembly process.

There is a demand for miniaturization of electronic apparatuses in which rotating devices are mounted as well as improvement in performance. Also, the rotating devices in which fluid dynamic bearings are adopted are mostly requested to be miniaturized, in particular, to be thinned in the axial direction of the rotating shaft. Herein, the case where the thinning in the axial direction of the rotating shaft of the rotating device having a structure in which a shaft and a hub are connected together in an assembly process as stated above is to be achieved, will be considered. If the length of a shaft to be housed in a sleeve of which part of a fixed body is composed is made small for the thinning, the stability of supporting the shaft is deteriorated, and hence there arises the fear that eccentricity during rotation may be caused. Alternatively, thinning of the hub can be considered for the thinning of the whole rotating device; however, the thinning thereof induces a decrease in the stiffness as a hub as well as shortening of the axial connection margin occurring when the hub is connected to the shaft. The shortening of the connection margin induces a decrease in the connection strength between the shaft and the hub and a decrease in the squareness occurring when the two parts are connected together, and hence there arises the problem that stable high-speed rotation cannot be obtained as a rotating device for a fluid dynamic nearing. Alternatively, it can be considered that only the part of the hub corresponding to a connection margin is to be extended in the axial direction of the shaft; however, the length of the shaft to be housed in the sleeve is shortened by the length equal to the extended connection margin, and hence the same problems arise as in the aforementioned shortening of the shaft.

SUMMARY OF THE INVENTION

The present invention has been made in view of these situations, and a purpose of the invention is to provide a rotating body for a fluid dynamic bearing in which stable high-speed rotation can be obtained while thinning of the rotating body is achieved. Another purpose thereof is to provide a method of producing such a rotating body for a fluid dynamic bearing.

In order to solve the aforementioned problems, a rotating body according to an embodiment of the present invention is a rotating body for a fluid dynamic bearing used for rotating a recording disk that has been mounted therein, and comprises: a rotating shaft portion in which a cylindrical portion that serves as a rotating shaft and a protruding portion extended radially outward from one end of the cylindrical portion are formed integrally with each other; and a hub that is to be connected to the end portion near to the outer circumference of the protruding portion and that has a mounting seat portion on which the recording disk is to be mounted.

According to the embodiment, because the cylindrical portion extending in the axial direction of the rotating shaft and the protruding portion extending at a right angle to the rotating shaft are formed integrally with each other in the rotating shaft portion, the strength of the connection part between the cylindrical portion and the protruding portion and the squareness of the joint between them can be easily secured. Further, because the cylindrical portion and the protruding portion are formed integrally with each other, it is not needed to make the connection margin between the two portions large, and hence the portion corresponding to the connection margin can be shortened. As a result, the axial length of the rotating shaft portion can be shortened by thinning the portion corresponding to the connection margin, without shortening the length of the cylindrical portion by which the supporting stability is affected. That is, thinning of the rotating body can be achieved. On the other hand, the mounting seat portion of which the hub is composed is connected to the end portion near to the outer circumference of the protruding portion. In this case, because a large connection area can be secured in the connection part between the protruding portion and the hub including the mounting seat portion by overlapping the surfaces of the two one on another, the surfaces respectively being radially extended, the connection strength between the rotating shaft portion and the hub can be easily secured. Further, because the connection part between the protruding portion and the hub can be thinned in the axial direction of the rotating shaft, thinning in such the direction of the rotating body can be achieved. The rotating shaft portion and the hub can be formed by a combination of a cutting process, a press process, a grinding process, and a polishing process, etc. In addition, the rotating shaft portion and the hub can be joined together by adhesive, welding, or the like.

Another embodiment of the present invention is a method of producing a rotating body for a fluid dynamic bearing. The method is a method of producing a rotating body for a fluid dynamic bearing used for rotating a recording disk that has been mounted therein, and comprises: subjecting integrally a cylindrical portion that serves as a rotating shaft, a protruding portion extended radially outward from one end of the cylindrical portion, an annular portion extended in the axial direction of the rotating shaft of the cylindrical portion at the end portion near to the outer circumference of the protruding portion, and a mounting seat portion that is formed in part of the annular portion and is extended radially outward such that a recording disk is to be mounted, to a press process; adjusting the processed dimensions of the cylindrical portion, the protruding portion, the annular portion, and the mounting seat portion, which have been subjected to the press process; and subjecting the surfaces of the cylindrical portion, the protruding portion, the annular portion, and the mounting seat portion, the processed dimensions of which have been adjusted, to surface coating.

According to the embodiment, because the cylindrical portion, the protruding portion, the annular portion, and the mounting seat portion are formed integrally with each other by a press process, the connection strength of the connection part between the cylindrical portion and the protruding portion and the squareness of the joint between them can be easily secured. Further, the dimensional accuracy of the whole of the cylindrical portion, the protruding portion, the annular portion, and the mounting seat portion can be easily secured by performing the adjustment of the processed dimensions of the four portions with a grinding process and a polishing process, etc., after any one of the four portions has been determined as a supporting reference. Furthermore, by subjecting the cylindrical portion, the protruding portion, the annular portion, and the mounting seat portion to surface coating, such as, for example, electroless nickel plating, gas generation from the material can be prevented, and protection of the surface and improvement in the surface hardness can also be achieved.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE PREFERRED EMBODIMENTS

The invention will now be described by reference to the preferred embodiments. This does not intend to limit the scope of the present invention, but to exemplify the invention.

Hereinafter, the preferred embodiments of the present invention will be described with reference to the accompanying drawings. The same or equivalent constituting elements and members illustrated in each drawing shall be denoted by the same reference numerals, and duplicative explanations will be omitted. Dimensions of members illustrated in each drawing are appropriately enlarged or reduced for easy understanding. Part of the members not important for describing the embodiments are omitted from each drawing.

Figure 1:
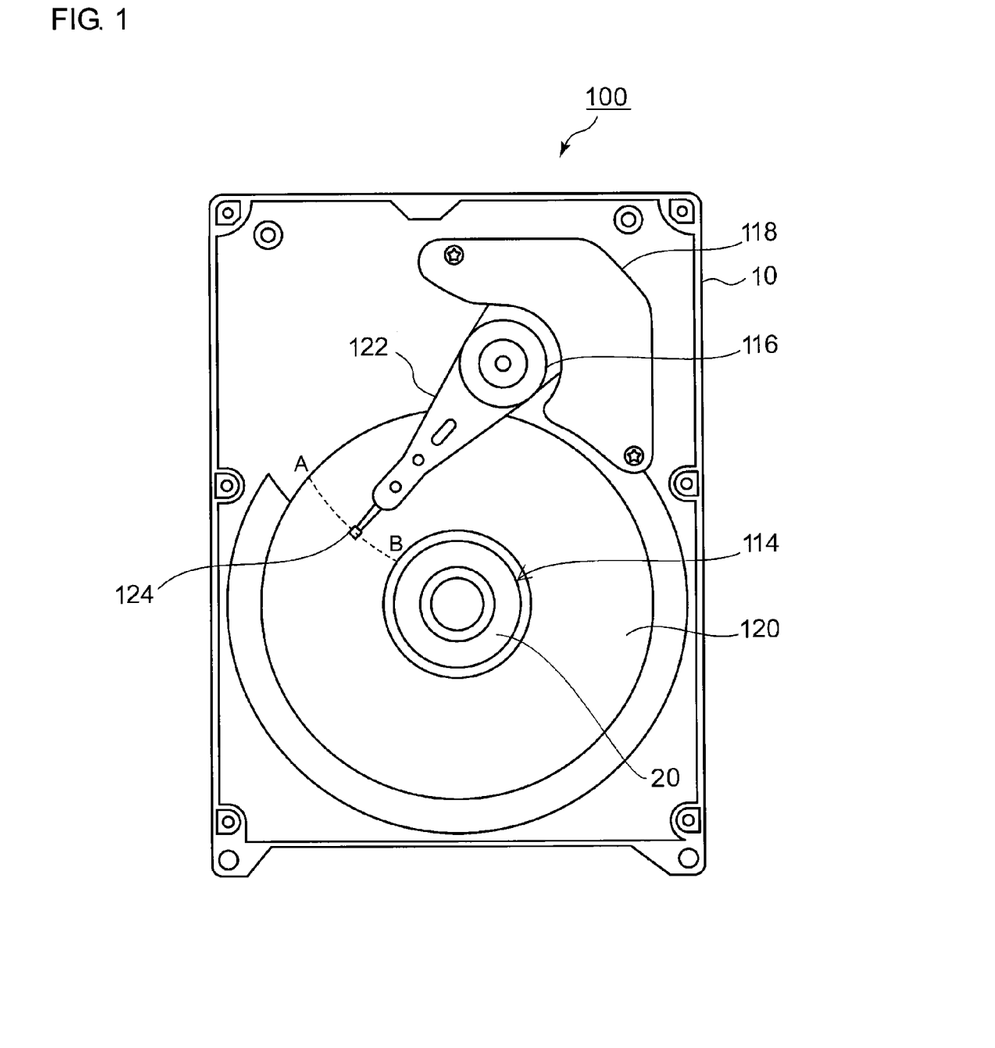
FIG. 1 is a top view illustrating a disk drive device, which is one example of a rotating device to which a rotating body for a fluid dynamic bearing according to the present embodiment has been applied.

FIG. 1 is an illustrative view for explaining the internal structure of a disk drive device 100, which is one example of a rotating device to which a rotating body for a fluid dynamic bearing according to the present embodiment has been applied. FIG. 1 illustrates a state in which a cover has been removed to expose the internal structure.

A brushless motor 114, an arm bearing unit 116, and a voice coil motor 118, etc., are mounted on the upper surface of a base member 10. The brushless motor 114 rotates around the rotating shaft and has a hub 20 on which a recording disk 120 is mounted. The recording disk 120 is a medium on which data can be magnetically recorded by being rotationally driven. The brushless motor 114 can be replaced by, for example, a spindle motor. The brushless motor 114 is driven by a three-phase drive current consisting of a U-phase, a V-phase, and a W-phase. The arm bearing unit 116 supports a swing arm 122 in a swing-free-manner within a movable range AB. The voice coil motor 118 makes the swing arm 122 swing in accordance with external control data. A magnetic head 124 is attached to the tip of the swing arm 122. When the disk drive device 100 is in an operating state, the magnetic head 124 moves, with the swing of the swing arm 122, within the movable range AB and above the surface of the recording disk 120 via a slight gap between the surface of the recording disk 120 and the magnetic head 124, thereby reading/writing data. It is noted that, in FIG. 1, the point A corresponds to the position at the outermost recording track of the recording disk 120 and the point B to the position at the innermost recording track thereof. The swing arm 122 may be transferred to a waiting position provided on the side of the recording disk 120 when the disk drive device 10 is in a stopped state.

In the present embodiment, a device including all of the components for reading/writing data, such as the recording disk 120, the swing arm 122, the magnetic head 124, and the voice coil motor 118, etc., is sometimes expressed as a disk drive device, or sometimes expressed as an HDD. Alternatively, only the part for rotationally driving the recording disk 120 is sometimes expressed as a disk drive device.

Figure 2:
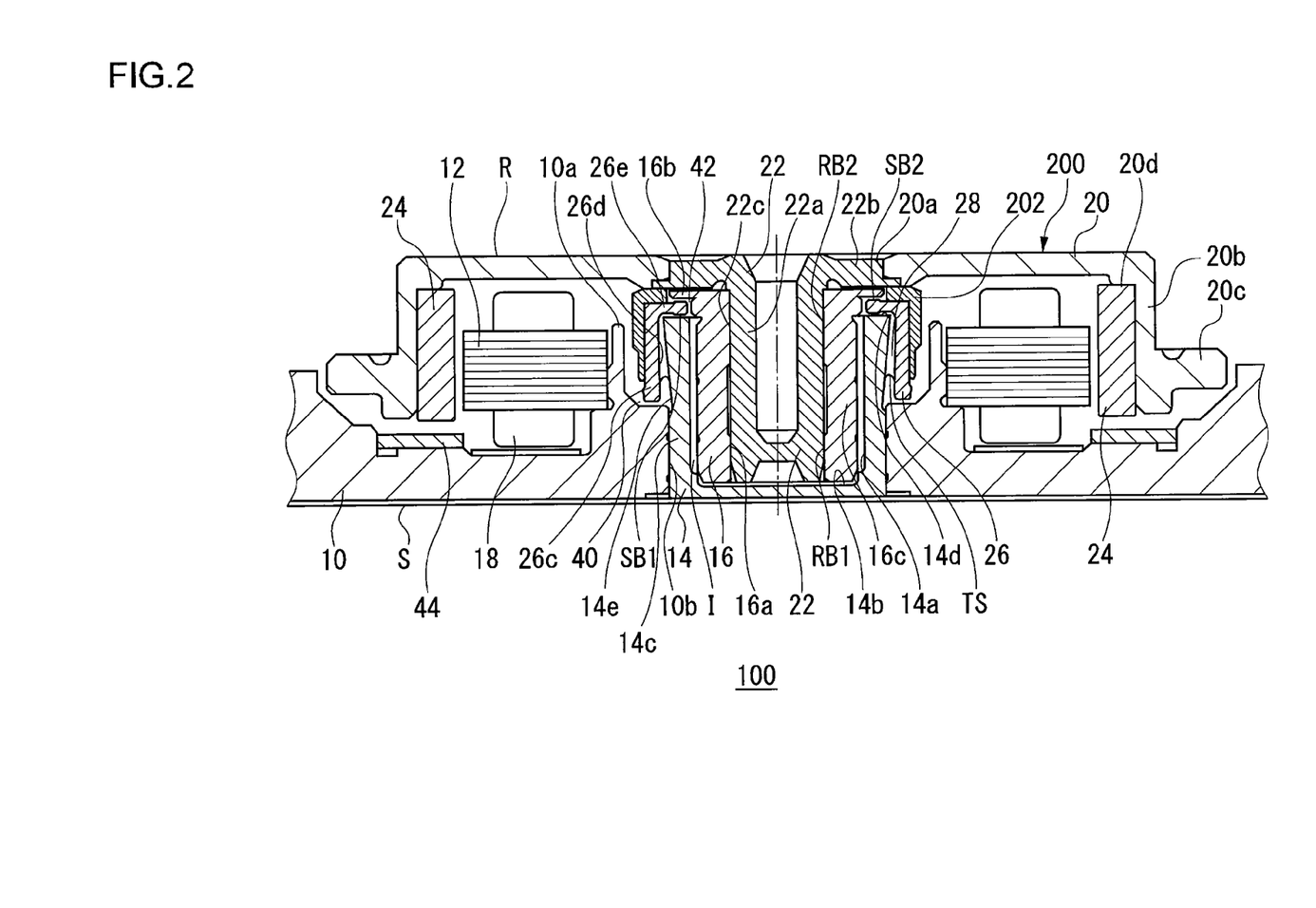
FIG. 2 is a schematic sectional view of a brushless motor to which the rotating body for a fluid dynamic bearing in FIG. 1 has been applied.

FIG. 2 is a schematic sectional view of the disk drive device 100 including a brushless motor to which the rotating body for a fluid dynamic bearing according to the present embodiment has been applied, taken along the axial direction of a rotating shaft portion 22. The disk drive device 100 includes a fixed unit S and a rotating unit R. The fixed unit S has a base member 10, a stator core 12, a housing 14, and a sleeve 16. The rotating unit R has the hub 20, the rotating shaft portion 22, a magnet 24, and a thrust member 26. The base member 10 has a cylinder portion 10a and the housing 14 has a groove 14a, a bottom 14b, a housing cylinder portion 14c, and a housing flat portion 14d. The sleeve 16 has a cylinder portion inner circumferential surface 16a, a circumferentially protruding portion 16b, and a sleeve cylinder portion 16c and a coil 18 is wound around the stator core 12. In the present embodiment, a rotating body 200 is composed of the hub 20 and the rotating shaft portion 22. The rotating shaft portion 22 has a shape in which a cylindrical portion 22a that serves as a rotating shaft and a protruding portion 22b extended radially outward, i.e., extended in the substantially right angle direction to the rotating shaft, from one end of the cylindrical portion 22a, are formed integrally with each other. In addition, the hub 20 has a central hole 20a, an annular portion 20b, a mounting seat portion 20c, a pedestal portion 20d. The hub 20 and the rotating shaft portion 22 becomes a substantially integrated part by the inner circumferential surface of the central hole 20a of the hub 20 and the outer circumferential surface of the protruding portion 22b of the rotating shaft portion 22 being joined together with means of adhesive, welding, or a combination thereof, thereby allowing the rotating body 200 to be formed. The rotating body 200 will be described in detail later. For convenience, in the following description, the lower side illustrated in each illustrative view is expressed as bottom and the upper side illustrated therein is expressed as top, as a whole.

The base member 10 has a hole portion 10b at the central portion thereof and the cylinder portion 10a provided so as to surround the hole portion 10b. In the base member 10, the housing 14 is held by the hole portion 10b. Also, in the base member 10, the stator core 12 is firmly fixed near to the outer circumference of the cylinder portion 10a that surrounds the housing 14. An annular first area portion 40 is formed between the outer circumference of the housing 14 and the inner circumference of the cylinder portion 10a. The first area portion 40 has a shape in which the hole portion 10b of the base member 10 is surrounded. The base member 10 can be formed by subjecting an aluminum die cast part to a cutting process, or by subjecting a press-processed aluminum plate or steel plate to nickel plating.

Figure 3:
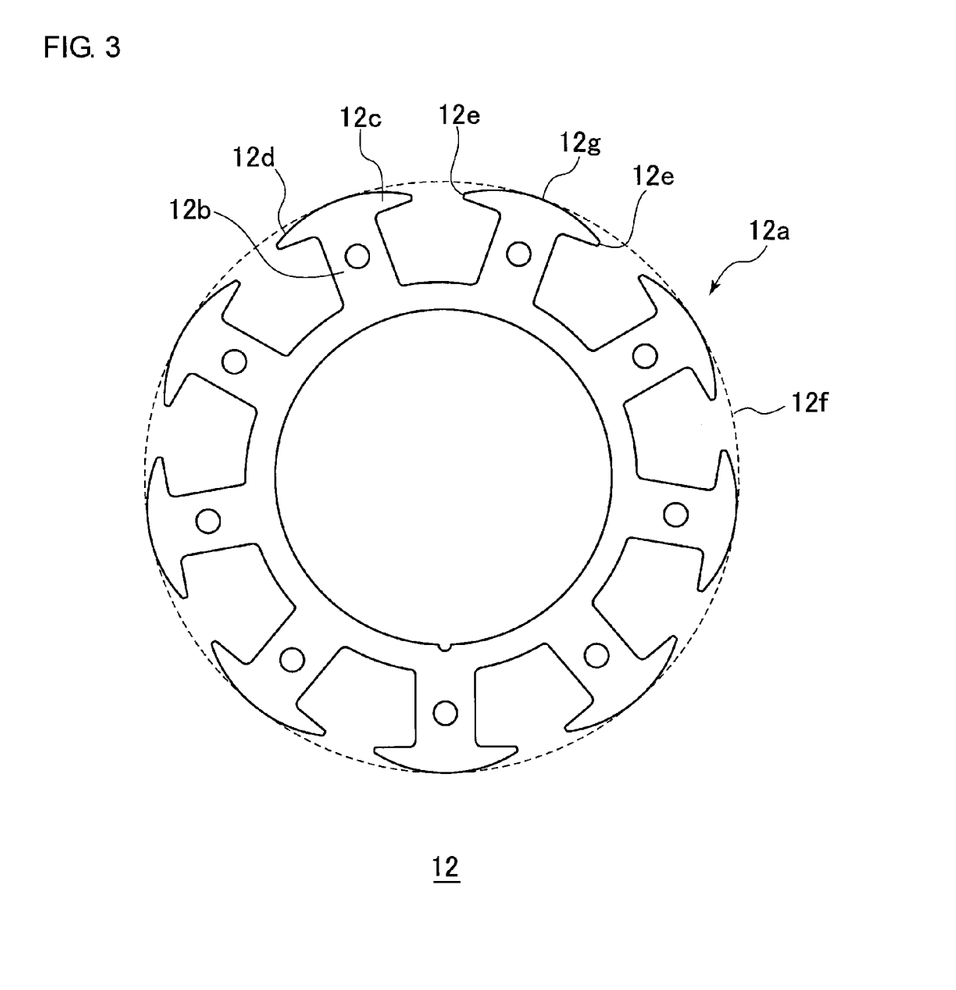
FIG. 3 is an illustrative view explaining the shape of a stator core used in conjunction with the rotating body for a fluid dynamic bearing in a rotating device according to the embodiment.

The stator core 12 is firmly fixed to the outer circumferential surface of the cylinder portion 10a. The stator core 12 is formed by laminating magnetic materials, such as silicon steel plates, and then by subjecting the surfaces of them to insulating coating, such as electro-deposition coating, powder coating, or the like. As illustrated in FIG. 3, the stator core 12 has a ring shape in which a plurality of salient poles 12a each wound with the coil 18 protrude outward. The number of the salient poles is made to be, for example, nine, when the disk drive device 100 is three-phase driven. The salient pole 12a has a rod-shaped body 12b around which the coil 18 is wound and a tooth portion 12c that is provided radially outside the rod-shaped body 12b and extends circumferentially. The outer circumferential surface 12d of the tooth portion 12c is formed so as to be arc-shaped.

To reduce a vibration during the drive occurring in response to the demand for miniaturization, it is preferable to reduce a torque ripple and cogging torque in the disk drive device 100 according to the embodiment. In the disk drive device 100, drive torque is generated by the interaction between a magnetic flux formed by the coil 18 and the magnetic pole of the magnet 24. A torque ripple is a pulsating component included in the drive torque and indicates a fluctuation range of the torque during rotation. Cogging torque is pulsating torque that is generated when the rotating body 200 is operated in a non-powered state and generated due to a factor at the magnetization of the salient pole 12a of the stator core 12 and the magnet 24.

Figure 4A:
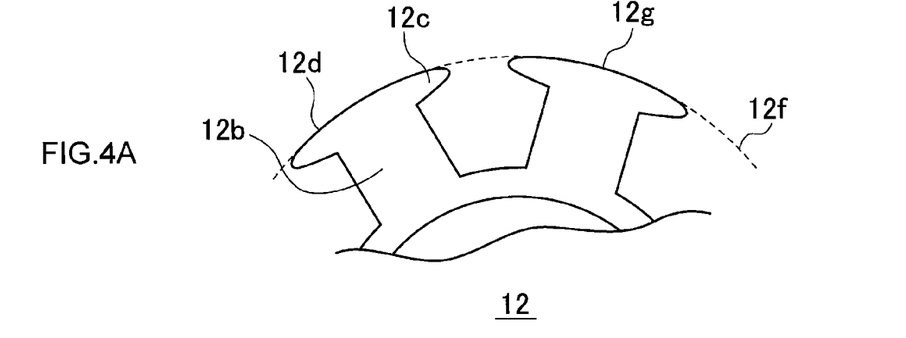
FIG. 4A is an illustrative view explaining a variation of the stator core in FIG. 3.
Figure 4B:
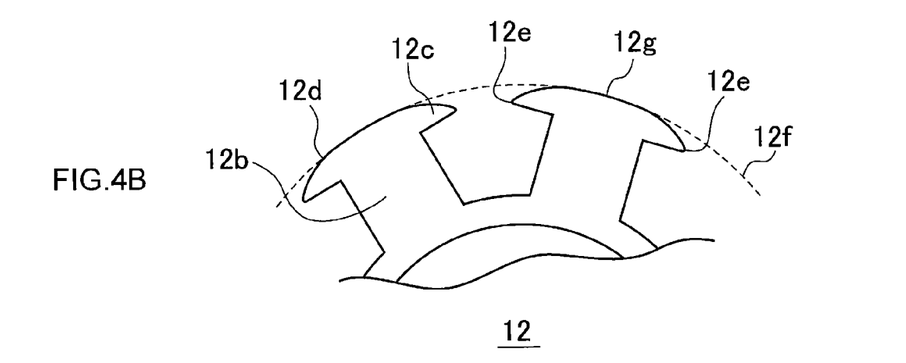
FIG. 4B is an illustrative view explaining a variation of the stator core in FIG. 3.
Figure 4C:
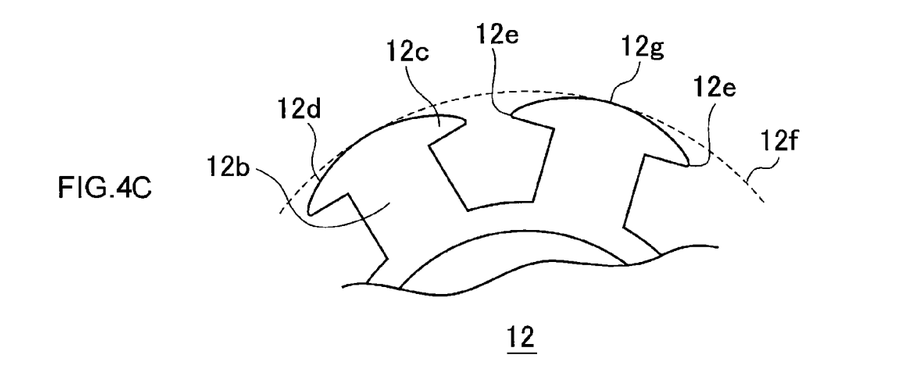
FIG. 4C is an illustrative view explaining a variation of the stator core in FIG. 3.

The stator core 12 according to the embodiment is formed such that the circumferential end 12e located at the circumferential end of the tooth portion 12c is located radially inside a circumscribed circle 12f passing through a tip 12g located at the radially outermost end of the tooth portion 12c. The circumferential end 12e is a tip where the circumferential end of the tooth portion 12c is pointed. The inventors has measured changes in the cogging torque and torque ripples by forming the stator cores 12 in which the shapes of the tooth portions 12c of the salient poles 12a are variously changed, as illustrated in FIGS. 4A to 4C. The tooth portion 12c of the stator core 12 illustrated in FIG. 4A is formed such that the whole outer circumferential surface 12d has the same curvature radius as that of the circumscribed circle 12f. The tooth portion 12c of the stator core 12 illustrated in FIG. 4B has a shape in which the end portion of the outer circumferential surface 12d of the tooth portion 12c in FIG. 4A has been shaved. Accordingly, the circumferential end 12e of the tooth portion 12c is located radially inside the circumscribed circle 12f, although the central portion of the outer circumferential surface 12d has the same curvature radius as that of the circumscribed circle 12f. The circumferential end 12e of the tooth portion 12c in FIG. 4C is located further radially inside the circumscribed circle 12f in comparison with that in FIG. 4B.

When the rotating body 200 is rotated in a non-powered state, back electromotive force is generated in the coil 18. As the back electromotive force has a curve closer to a sine curve, the cogging torque and torque ripple are reduced, and accordingly the rotating body 200 can be smoothly rotated during the drive, thereby allowing a vibration during the drive to be reduced. When the back electromotive forces in structures in FIGS. 4A to 4C are compared with each other, the back electromotive force in the structure in FIG. 4A is most deviated from a sine curve, whereas that in the structure in FIG. 4C is closest to a sine curve. That is, the inventors have found that, as the circumferential end 12e is formed so as to be located more radially inside the circumscribed circle 12f passing through the tip 12g located at the radially outermost end of the tooth portion 12c, a vibration generated during the drive can be reduced by reducing the cogging torque and torque ripple.

The wiring terminal of the coil 18 is soldered on an FPC (Flexible Printed Circuit) arranged on the bottom surface of the base member 10. The pulled-out wire terminal is fixed with adhesive so as not to unlay. The fixation is performed to prevent disconnection of the wire due to a vibration of large amplitude created by a resonance of the wire during ultrasonic wave cleaning, etc. When a three-phase current having an approximate sine wave shape is applied to the coil 18 through the FPC by a predetermined drive circuit, the coil 18 generates a rotating magnetic field in the salient poles of the stator core 12. A rotating drive force is then generated by the interaction between the driving magnetic poles of the magnet 24 and the rotating magnetic field, which rotates the rotating unit R.

An attracting plate 44 is fixed to a position on the base member 10 facing the axial lower end surface of the ring-shaped magnet 24 via a gap. The attracting plate 44 is a ring-shaped member and is formed by pressing a soft magnetic material, for example, a cold-rolled steel plate. The attracting plate 44 generates axial magnetic attracting force between the magnet 24 and itself. That is, the attracting plate 44 generates rotating body-attracting force in the direction opposite to the floating force received by the rotating unit R during the rotation. The rotating unit R is made to rotate in a non-contact state with surrounding members with the floating force, the rotating body-attracting force, and the gravity applied to the rotating unit being balanced during the rotation of the rotating unit R.

The housing 14 is firmly fixed to the inner circumferential surface of the hole portion 10b of the cylinder portion 10a by adhesion or press-fitting. The housing 14 has an approximately cup-like shape in which the housing cylinder portion 14c surrounding the sleeve 16, the housing flat portion 14d that is provided at the end portion near to the protruding portion 22b and that has the surface facing in the axial direction, and the bottom 14b by which the end portion of the housing cylinder portion 14c opposite to the housing flat portion 14d is sealed, are joined together. The housing 14 is arranged so as to seal the lower end of the sleeve 16 and make the upper end thereof protrude with such a shape. In addition, the bottom 14b and the housing cylinder portion 14c may be formed integrally with each other, or both may be firmly fixed together after being formed as different members. The housing 14 may be formed of a copper-based alloy, a sintered alloy by powder metallurgy, stainless steel, or a plastic material, such as polyetherimide, polyimide, polyamide, etc. When the housing 14 is formed with a plastic material, it is desirable that the plastic material is made by containing carbon fiber such that the specific resistance of the material is smaller than or equal to $10^6$ Ω·m order to secure the static eliminating performance of the disk drive device 100.

A groove 14a extending in the axial direction is formed on the inner circumferential surface of the housing 14. The groove 14a serves as a communication hole for communicating both end surface sides of the housing 14 when the sleeve 16 is fit into the housing cylinder portion 14c. The communication hole becomes a communication channel I by being filled with lubricant 28. The cross-sectional shape of the groove 14a may be a concaved arc shape or a concave shape. This communication channel I will be described later.

The sleeve 16 is firmly fixed to the inner circumferential surface of the housing 14 by adhesion or press-fitting and is fixed on the same axis as that of the hole portion 10b at the central portion of the base member 10. The sleeve 16 has a shape in which the annular sleeve cylinder portion 16c that supports the rotating shaft portion 22 by housing the rotating shaft portion 22, and the circumferentially protruding portion 16b that is extended in the outer diameter direction at the end portion near to the rotating body 200 of the sleeve cylinder portion 16c, are joined together. In addition, the cylinder portion inner circumferential surface 16a is formed inside the sleeve cylinder portion 16c so as to surround the rotating shaft portion 22. The circumferentially protruding portion 16b and the sleeve cylinder portion 16c may be formed integrally with each other, or both may be firmly fixed together after being formed as different members. An annular second area portion 42 is formed between the circumferentially protruding portion 16b and the housing cylinder portion 14c. The sleeve 16 is also formed of a copper-based alloy, a sintered alloy by powder metallurgy, stainless steel, and a plastic material, such as polyetherimide, polyimide, polyamide, etc. When the sleeve 16 is formed with a plastic material, the plastic material is made by containing carbon fiber such that the specific resistance of the material is smaller than or equal to $10^6$ Ω·m order to secure the static eliminating performance of the disk drive device 100. When the sleeve 16 is formed with a sintered alloy by powder metallurgy, reduction in weight of parts can be achieved because the sleeve 16 can have porous property. However, in the case of a structure in which the sleeve 16 has porous property and part of the sleeve 16 is exposed from the base member 10, the clean air, e.g., air containing a large amount of helium, which has been injected into the disk drive device 100, sometimes leaks out due to the porous property. In the case of a structure in which part of the sleeve 16 is exposed outside, it is desirable to subject the exposed porous portion to a treatment for sealing it. For example, a sealing member made of a resin, etc., may be applied to the surface of the exposed portion or an oxidation treatment may be performed on the surface thereof. Alternatively, the exposed portion may be sealed by another part, e.g., the housing 14, etc., as illustrated in FIG. 2, or be sealed by deformation of another part.

A fixing bracket 202 for fixing the thrust member 26 is fixed near to the lower surface of the rotating body 200, i.e., near to the side facing the sleeve 16. The fixing bracket 202 is firmly fixed by using adhesive, etc. The shape of the fixing bracket 202 and a method of fixing it will be described later. Alternatively, the fixing bracket 202 and the hub 20 may be formed integrally with each other. For example, they can be formed by a press process or a cutting process. As a result, it is advantageous in terms of the joint strength between the fixing bracket 202 and the rotating body 200 being improved. The thrust member 26 is firmly fixed to the inner circumferential surface of the fixing bracket 202. The magnet 24 is firmly fixed to the inner circumferential surface of annular portion 20b of the rotating body 200. The magnet 24 is firmly fixed in a concentric state with the rotating shaft portion 22 so as to face the stator core 12 firmly fixed to the base member 10.

The thrust member 26 has a flange 26e surrounding the sleeve 16 and a hanging portion 26c surrounding the housing 14. The flange 26e is firmly adhered to the inner wall of the fixing bracket 202 with adhesive and the hanging portion 26c is joined to the outer edge portion of the flange 26e and is also firmly adhered to the inner wall of the fixing bracket 202 with adhesive. Thus, the flange 26e surrounds the outer circumference of the sleeve cylinder portion 16c via a gap and is arranged above the lower surface of the circumferentially protruding portion 16b via a narrow gap. While the thrust member 26 is rotating integrally with the rotating body 200, the flange 26e is rotating within the second area portion 42 and the hanging portion 26c is rotating within the first area portion 40.

The flange 26e has a shape in which a thrust upper surface and a thrust lower surface are included, the shape being thin in the axial direction. The hanging portion 26c extends in the axial direction from the lower surface near to the outer circumference of the flange 26e. A first thrust dynamic pressure generating portion (first thrust dynamic bearing SB1) is composed of the thrust lower surface of the flange 26e and the housing flat portion 14d that is the upper end portion of the housing 14; and a second thrust dynamic pressure generating portion (second thrust dynamic bearing SB2) is composed of the thrust upper surface of the flange 26e and the lower surface of the circumferentially protruding portion 16b. The axial length of the hanging portion 26c is larger than that of the flange 26e. The inner circumferential surface 26d of the hanging portion 26c is tapered in which the radius thereof is reduced toward the side opposite to the flange 26e, thereby allowing a capillary seal portion TS, which will be described later, to be formed.

The thrust member 26 has a function of preventing the rotating unit R from coming off the fixed unit S other than a function of forming the thrust dynamic pressure generating portion. If the rotating unit R and the fixed unit S are relatively transferred due to an impact, the flange 26e will be brought into contact with the lower surface of the circumferentially protruding portion 16b. As a result, the thrust member 26 receives stress in the direction where the thrust member 26 will come off the fixing bracket 202. Because the joint strength between the hanging portion 26c and the fixing bracket 202 becomes weak if the axial joint distance between the two is small, the possibility that the joint may be destroyed even by a small impact becomes high. That is, as the joint distance between the hanging portion 26c and the fixing bracket 202 is made larger, the joint becomes stronger against an impact.

On the other hand, when the flange 26e becomes thick, the capillary seal portion TS becomes short, thereby causing the capacity for the lubricant 28 that can be held in the capillary seal portion TS to be small. Accordingly, there is the possibility that, when the lubricant 28 is dispersed due to an impact, the lubricant 28 may be immediately lacking. The functions of a fluid dynamic bearing are deteriorated due to such a lack in the lubricant and hence a malfunction, such as burning, is likely to occur. In order to deal with such a problem, in the disk drive device 100, the capillary seal portion is made long in the up-down direction by thinning the flange 26e. As a result, an amount of the lubricant 28 that can be held therein becomes large, and the disk drive device 100 is structured such that the lubricant 28 is hardly lacking even if dispersed due to an impact. That is, the axial distance of the thrust member 26 is designed to be large with respect to the hanging portion 26c and to be small with respect to the flange 26e.

There is a method in which the outer circumferential surface of the hanging portion 26c is firmly fixed to the inner circumferential surface of the fixing bracket 202 by press-fitting; however, there is the fear that, when the hanging portion 26c receives stress due to the press-fitting, a deformation may occur in the inner circumferential surface of the hanging portion 26c, thereby possibly impairing the functions of the capillary seal portion TS. To deal with the fear, the outer circumferential surface of the hanging portion 26c is made small in diameter than the inner circumferential surface of the fixing bracket 202 and both are firmly adhered together by adhesion, as stated above. As a result, a deformation of the hanging portion 26c is prevented and the functions of the capillary seal portion TS can be sufficiently exhibited.

The magnet 24 is firmly fixed to the inner circumference of the annular portion 20b and provided so as to face the outer circumference of the stator core 12 via a narrow gap. The magnet 24 is formed of an Nd—Fe—B (Neodymium-Ferrum-Boron) material. Electro-deposition coating or spray coating is performed on the surface of the magnet 24, and the magnet 24 near to the inner circumference is magnetized with twelve poles.

Subsequently, the fluid dynamic bearing in the structure of the disk drive device 100 will be described. A radial fluid dynamic bearing comprises a radial dynamic pressure generating portion formed by including the outer circumferential surface 22c of the rotating shaft portion 22, the cylinder portion inner circumferential surface 16a of the sleeve 16, and the lubricant 28, such as oil, etc., which is injected into the gap between the two. In the radial dynamic pressure generating portion, a first radial dynamic bearing RB1 is arranged away from the protruding portion 22b of the rotating body 200 and a second radial dynamic bearing RB2 is arranged near to the protruding portion 22b in the state where the two are spaced apart from each other in the axial direction. The first radial dynamic bearing RB1 and the second radial dynamic bearing RB2 are provided in the gap between the cylinder portion inner circumferential surface 16a and the outer circumferential surface 22c so as to support the rotating unit R by generating radial dynamic pressure. In the first radial dynamic bearing RB1 and the second radial dynamic bearing RB2, a first radial dynamic pressure groove and a second radial dynamic pressure groove for generating dynamic pressure are provided on at least one of the outer circumferential surface 22c and the cylinder portion inner circumferential surface 16a, the two surfaces 22c and 16a facing each other. Each of the radial dynamic pressure grooves is formed into, for example, a herring-born shape.

When the rotating unit R is rotating, the radial dynamic pressure groove generates radial dynamic pressure such that the cylindrical portion 22a is supported by the radial dynamic pressure via a predetermined radial gap relative to the sleeve 16. In the present embodiment, the axial formation width of the first radial dynamic pressure groove is formed to be narrower than that of the second radial dynamic pressure grove. Thereby, a pair of radial dynamic pressure corresponding to a pair of side pressure with different strength in the axial direction of the cylindrical portion 22a are generated in the first radial dynamic bearing RB1 and the second radial dynamic bearing RB2. As a result, the optimal balance of high shaft stiffness and a low shaft loss can be obtained.

On the other hand, a thrust dynamic bearing comprises a first thrust dynamic bearing SB1 and a second thrust dynamic bearing SB2. Herein, the first thrust dynamic bearing SB1, i.e., a first thrust dynamic pressure generating portion is formed by the thrust lower surface of the flange 26e, the upper end portion of the housing 14, and the lubricant 28 injected into the axial gap between the two. The second thrust dynamic bearing SB2, i.e., a second thrust dynamic pressure generating portion is formed by the thrust upper surface of the flange 26e, the lower surface of the circumferentially protruding portion 16b, and the lubricant 28 injected into the axial gap between the two.

A thrust dynamic pressure groove (not illustrated) for generating dynamic pressure is formed on at least one of the surfaces of the axial gap, the surfaces facing each other. The thrust dynamic pressure groove is formed into, for example, a spiral shape or a herring-born shape. A thrust dynamic bearing SB generates, with the rotation of the rotating unit R, dynamic pressure in the pump-in direction, as a whole, and makes axial force, i.e., floating force act on the rotating unit R by the generated dynamic pressure. The lubricant 28 injected into each of the gaps in the first radial dynamic bearing RB1, the second radial dynamic bearing RB2, the first thrust dynamic bearing SB1, and the second thrust dynamic bearing SB2 is commonly used, and is prevented from leaking out by being sealed with the capillary seal portion TS.

The capillary seal portion TS is composed of the outer circumferential surface 14e of the housing 14 and the inner circumferential surface 26d of the thrust member 26. The outer circumferential surface 14e has a tapered surface in which the diameter thereof is reduced going from the upper surface toward the lower surface. On the other hand, the inner circumferential surface 26d facing the outer circumferential surface 14e also has a tapered surface in which the diameter thereof is reduced going from the upper surface toward the lower surface.

With such a structure, the outer circumferential surface 14e and the inner circumferential surface 26d form the capillary seal portion TS in which the gap between the two expands going from the upper surface toward the lower surface. Herein, an injection amount of the lubricant 28 is set such that the boundary surface (liquid surface) between the lubricant 28 and ambient air is located in the middle of the capillary seal portion TS, and hence the lubricant 28 is sealed by the capillary seal portion TS with capillarity. As a result, a leak of the lubricant 28 is prevented. That is, the lubricant 28 is to be injected into a lubricant holding portion including: the first radial dynamic bearing RB1, the second radial dynamic bearing RB2, the first thrust dynamic bearing SB1, and the second thrust dynamic bearing SB2; the space between the housing 14 and the thrust member 26; and the space between the circumferentially protruding portion 16b and the fixing bracket 202, etc.

As stated above, the capillary seal portion TS is designed such that the inner circumferential surface 26d, which is the outside tapered surface, is reduced in diameter going from the upper surface toward the lower surface. Accordingly, with the rotation of the rotating unit R, centrifugal force acts on the lubricant 28 in the direction where the lubricant 28 is forced to move toward the inside of the space into which the lubricant 28 is injected, and hence a leak of the lubricant 28 can be more surely prevented. Further, the communication channel I can be secured by the groove 14a formed along the axial direction on the inner circumferential surface of the housing 14. Because both sides of the first radial dynamic bearing RB1 and the second radial dynamic bearing RB2 are communicated by the communication channel I, the whole pressure balance in the two radial dynamic bearings can be well maintained even if a pressure balance in either of the radial dynamic bearings breaks down. Further, if a dynamic pressure balance in each of the first radial dynamic bearing RB1, the second radial dynamic bearing RB2, and the thrust dynamic bearing SB, breaks down due to a disturbance, such as application of external force to the rotating unit R, the pressure is instantly averaged and the pressure balance can be maintained. As a result, a floating amount of the rotating unit R relative to the fixed unit S is stabilized, thereby allowing the disk drive device 100 with high reliability to be obtained.

Figure 5:
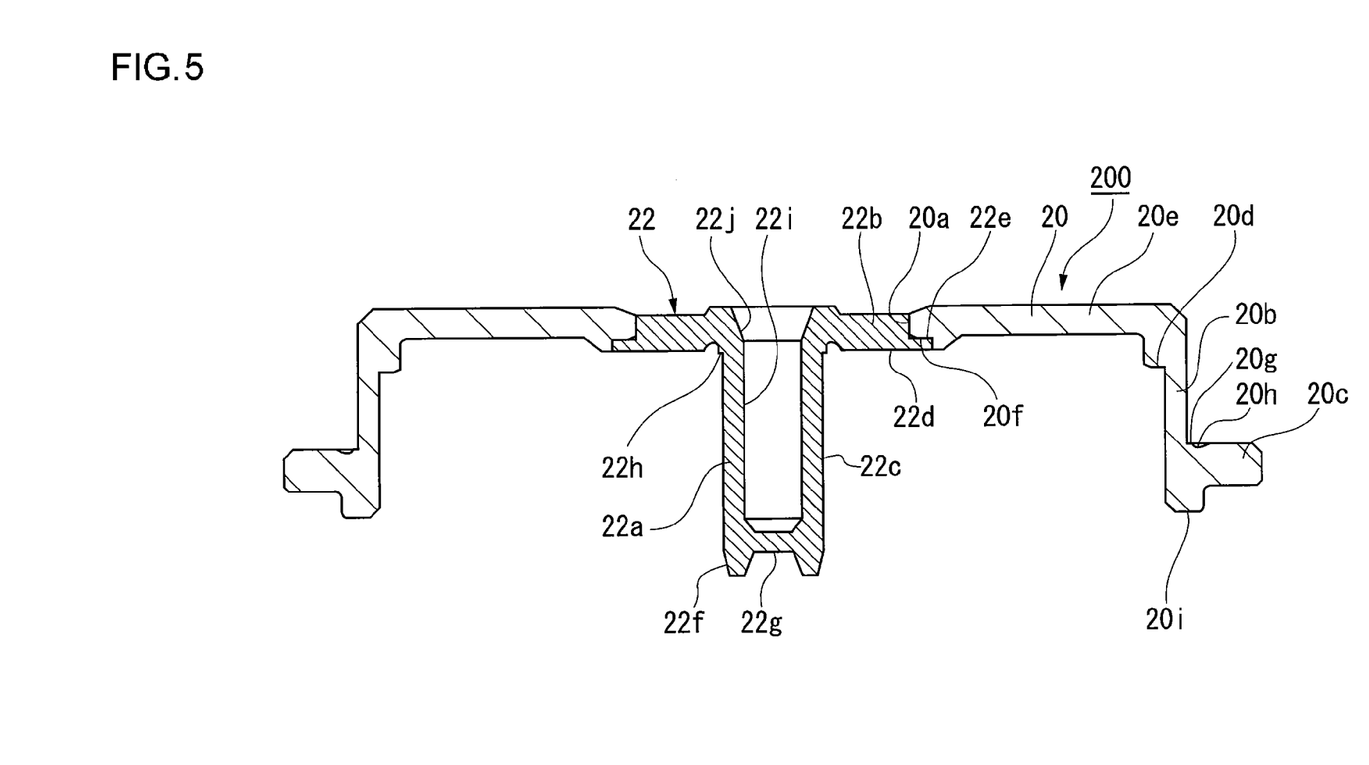
FIG. 5 is a sectional view of the rotating body for a fluid dynamic bearing according to the embodiment.

FIG. 5 is a sectional view illustrating in detail the shape of the rotating body 200 according to the present embodiment. As stated above, the rotating body 200 is composed of the hub 20 and the rotating shaft portion 22. In a conventional structure corresponding to the rotating body 200 according to the embodiment, a rod-shaped shaft having an approximately straight shape is fixed to a connection hole formed in a cup-shaped hub. Accordingly, the rod-shaped shaft and the hub are connected together by a connection margin equal to the thickness of the hub. On the other hand, there are demands for reduction in size and weight and for thinning of electronic apparatuses. The same is true for the electronic apparatuses in which disk drive devices are mounted. Accordingly, hubs in the disk drive devices are requested to be thinned. The thinning of a hub induces the shortening of the connection margin between the rod-shaped shaft and the hub. As a result, there arise the problems that sufficient joint strength between the rod-shaped shaft and the hub cannot be secured or the squareness cannot be secured when the rod-shaped shaft and the hub are joined together, etc.

In order to deal with the problems, the rotating shaft portion 22 in the rotating body 200 according to the present embodiment has, not the shape of a rod-shaped shaft, but a shape in which the protruding portion 22b, a portion to be connected to the hub 20, is extended radially outward from one end of the cylindrical portion 22a, which is a rod-shaped shaft. That is, the cylindrical portion 22a and the protruding portion 22b are formed integrally with each other. The rotating shaft portion 22 in which the cylindrical portion 22a and the protruding portion 22b are integrated can be formed by, for example, subjecting a single material to a press process. By integrally forming the protruding portion 22b extending radially with respect to the cylindrical portion 22a, the strength of the protruding portion 22b with respect to the cylindrical portion 22a can be easily secured even if the axial thickness of the protruding portion 22b is thinned. Further, the squareness between the cylindrical portion 22a and the protruding portion 22b can be easily improved by the accuracy in the press process. Furthermore, by grinding and polishing, after the press process, the lower surface 22d of the protruding portion 22b and the outer circumferential surface 22c of the cylindrical portion 22a, not only the accuracy in the diameter dimension and the cylindricity of the outer circumferential surface 22c can be improved, but also the squareness of the protruding portion 22b with respect to the outer circumferential surface 22c can be easily and simultaneously improved. The outer circumferential surface 22c is to be a housed portion to be housed in the sleeve 16. The squareness can be further easily secured by simultaneously polishing the lower surface 22d and the outer circumferential surface 22c. Herein, the expression of "simultaneously" may mean that they are processed by a grindstone capable of simultaneously polishing two surfaces or that they are continuously processed without releasing the chucking of the rotating shaft portion 22 at the polishing thereof. The production of the rotating shaft portion 22 by a press process is advantageous in comparison with the case where the whole of the portion is produced by a cutting process, in terms of reduction in generated burrs and residual cutting chips and of quality improvement.

In the present embodiment, the axial length of the connection between the cylindrical portion 22a and the protruding portion 22b is made to be, for example, 1.0 mm or shorter, and preferably 0.7 mm. Because the cylindrical portion 22a and the protruding portion 22b are formed integrally with each other, as stated above, the stiffness can be maintained and the squareness can be easily secured even if the axial length is shortened, and accordingly the axial shortening (thinning) of the whole rotating body 200 can be achieved. The outer circumferential surface of the annular portion 20b and the upper surface of the mounting seat portion 20c are subjected to a polishing process, taking into consideration that the recording disk 120 can be mounted at a right angle relative to the cylindrical portion 22a. In addition, the mounting seat portion 20c is formed such that the axial thickness thereof is larger than that of a connection portion 20e (or the protruding portion 22b). That is, the thickness in the axial direction of the rotating shaft of the protruding portion 22b is smaller than that of the mounting seat portion 20c. Because the thickness of the mounting seat portion 20c is not involved in the axial thickness of the rotating body 200, the thinning of the rotating body 200 can be achieved by making the thickness of the mounting seat portion 20c large, even when the stability of supporting the recording disk 120 is improved.

The lower end outer circumferential portion 22f of the cylindrical portion 22a according to the present embodiment is designed to be tapered off to a point. In addition, the lower end bottom 22g is made to have a concave shape. A liquid reservoir space for the lubricant 28 can be formed in the space surrounded by the sleeve 16 and the housing 14 by making the lower end of the cylindrical portion 22a have a tapered shape or a concave shape. As a result, improvement in the performance of storing the lubricant 28 can be achieved.

A ridge portion is formed in the connection part between the cylindrical portion 22a and the protruding portion 22b in the rotating shaft portion 22, in which the diameter of the cylindrical portion 22a is increased by radially protruding from the outer circumferential surface 22c of the cylindrical portion 22a that is a regular diameter portion of the cylindrical portion 22a. The ridge portion can be formed as a reference step portion 22h. The accuracy in processing the diameter of the cylindrical portion 22a is important for stably rotating the rotating body 200 at high-speed, and therefore it is needed to manage the accuracy. The reference step portion 22h can be used as a mark for indicating a measuring reference position used when the diameter of the cylindrical portion 22a is measured. For example, when it is checked whether the diameter of the cylindrical portion 22a satisfies a design tolerance by random inspection or 100 percent inspection, etc., the diameter is measured by touching the probe of a measuring instrument with the reference step portion 22h. By providing the reference step portion 22h in such a way, measurement reproducibility in the random inspection or the 100 percent inspection is guaranteed, thereby allowing measurement reliability to be improved.

In addition, when the cylindrical portion 22a of the rotating shaft portion 22 is formed by a press process, it is needed to form an insertion hole 22i of a press mold inside the cylindrical portion 22a. Further, a tapered portion 22j, the diameter of which is increased toward the upper side, is provided at the open end of the insertion hole 22i in order to easily pull the press mold from the insertion hole 22i. When the recording disk 120 is mounted and fixed on/to the rotating body 200, it is needed to hold the recording disk 120 down from above by a clamp member (not illustrated). Accordingly, the insertion hole 22i is used for the holding down. In this case, the insertion hole 22i functions as an axial hole having an opening on the end surface on the side where the protruding portion 22b of the cylindrical portion 22a is provided. Accordingly, a screw portion where a screw for fixing the clamp member is screwed is formed in at least part of the insertion hole 22i, which is an axial hole. By forming the screw portion in the insertion hole 22i located at the central portion of the rotating body 200, it becomes possible to press and fix the recording disk 120 with the clamp member uniformly across the whole circumference of the recording disk 120. The tapered portion 22j also functions as a hole for positioning the clamp member. For example, if a tapered protrusion corresponding to the tapered portion 22j is provided at the center of the clamp member, centering of the damper member can be made only by engaging the tapered portion 22j with the protrusion. As a result, the positioning of the clamp member can be easily made and it can be suppressed that the recording disk 120 may be clamped non-uniformly due to a bias of the clamp member. In addition, the axial thickness of the rotating body 200 can be reduced by setting the depth of the tapered portion 22j to a depth in which the head portion of a screw for fixing the clamp member can be housed. Further, reduction in weight of the cylindrical portion 22a itself can also be achieved by forming the insertion hole 22i and the tapered portion 22j in the cylindrical portion 22a.

In the present embodiment, the diameter of the protruding portion 22b is made to be one and half times or more larger, and more preferably two times or more larger than that of the cylindrical portion 22a. By securing a large diameter for the protruding portion 22b, an area capable of being integrally formed by a press process is increased, thereby allowing the stiffness of the whole rotating shaft portion 22 to be improved. Further, because an area capable of being produced by a press process is enlarged, the aforementioned problems concerning residual burrs and cutting chips can be alleviated. A step portion 22e extending radially outward is formed at the end portion near to the outer circumference of the outer edge of the protruding portion 22b. The hub 20 is composed of the connection portion 20e, the annular portion 20b, and the mounting seat portion 20c. The connection portion 20e has the central hole 20a at the center in which a corresponding step portion 20f to be engaged with the step portion 22e of the protruding portion 22b is formed. The connection strength and the connection stability between the rotating shaft portion 22 and the hub 20 can be improved by increasing the radially extended areas of the step portion 22e and the corresponding step portion 20f. The recording disk 120 is mounted on the mounting seat portion 20c and pressed and fixed by the clamp member (not illustrated) fixed to the rotating shaft portion 22 with a screw. In this case, strong force heading toward the base member 10 (lower side) is applied to the connection part between the step portion 22e and the corresponding step portion 20f. To deal with the force, the step portion 22e may be provided near to the base member 10 (lower side) with respect to the corresponding step portion 20f. This structure prevents the fixation of the recording disk 120 from acting in the direction where the connection between the rotating shaft portion 22 and the hub 20 is dissolved, and therefore is advantageous in terms of the connection reliability between the hub 20 and the rotating shaft portion 22 being achieved. In addition, because the assembly of the rotating shaft portion 22 and the hub 20 can be made by a combination of the step portion 22e and the corresponding step portion 20f, it is preferable to form the two step portions in terms of easy assembly. After the engagement of the step portion 22e with the corresponding step portion 20f, it is desirable to join the connection portion between the protruding portion 22b and the connection portion 20e by welding, etc., thereby allowing the joint strength to be easily secured. The welding may be performed across the whole circumference of the connection portion or spot welding may be performed at positions spaced at equal intervals.

The annular portion 20b is connected to the connection portion 20e and extended in the axial direction of the rotating shaft of the cylindrical portion 22a. The extended length of the annular portion 20b can be determined in accordance with the number of the recording disks 120 to be mounted. For example, in the case of a specification in which multiple recording disks 120 are mounted, the extended length can be determined in accordance with the total thickness of the thickness of the multiple recording disks 120 and the thickness of spacers for separately mounting each recording disk 120. The mounting seat portion 20c extended radially outward is integrally formed in part of the annular portion 20b. The radially-outward-extended length of the mounting seat portion 20c is determined in accordance with the non-recording area around the central hole of the recording disk 120.

The pedestal portion 20d is formed in the connection part between the annular portion 20b and the connection portion 20e, thereby allowing the fixation of the magnet 24 to be stabilized and an increase in leaking magnetic flux of the magnet 24 to be suppressed. Also, in the connection part between the annular portion 20b and the mounting seat portion 20c, a concave portion 20h that is axially concaved is formed such that a reference step portion 20g is formed in the connection part between the annular portion 20b and the mounting seat portion 20c. The accuracy in processing the diameter of the annular portion 20b is important for stably mounting and supporting the recording disk 120, and therefore it is needed to manage the accuracy. The reference step portion 20g can be used as a mark for indicating a measuring reference position used when the diameter of the annular portion 20b is measured. For example, when it is checked whether the diameter of the annular portion 20b satisfies a design tolerance by random inspection or 100 percent inspection, etc., the diameter is measured by touching the probe of a measuring instrument with the reference step portion 20g. By providing the reference step portion 20g in such a way, measurement reproducibility in the random inspection or the 100 percent inspection is guaranteed, thereby allowing measurement reliability to be improved. Also, by forming the concave portion 20h, a form can be made in which multiple points around the central hole of the recording disk 120 can be substantially supported by the reference step portion 20g and the mounting seat portion 20c. Although the mounting seat portion 20c on which the recording disk 120 is to be mounted is smoothed by a polishing process, etc., the recording disk 120 is likely to be affected by any concavities and convexities or rolls, which remain after the polishing of the mounting seat portion 20c, when the surface to be supported of the recording disk 120 is wholly supported by the mounting seat portion 20c. Accordingly, by reducing the supporting area with the concave portion 20h being formed, a risk by the concavities and convexities or rolls is reduced and reduction in weight of the mounting seat portion 20c, i.e., reduction in weight of the hub 20 can be achieved.

In addition, in the annular portion 20b according to the present embodiment, a protruding portion 20i is formed below the position where the mounting seat portion 20c is formed. The protruding portion is to be the back yoke of the magnet 24 supported by the annular portion 20b. An increase in leaking magnetic flux of the magnet 24 is prevented by forming the protruding portion 20i. An increase in leaking magnetic flux is suppressed by making the diameter of the protruding portion 20i to be smaller than that of the mounting seat portion 20c, i.e., by forming the protruding portion 20i such that a concave shape is formed on the lower surface of the mounting seat portion 20c.

In the present embodiment, it is desirable to form the rotating shaft portion 22 and the hub 20, of which the rotating body 200 is composed, of, for example, stainless steel having strong magnetism, for example, SUS 430. In this case, it is desirable to make the content of sulfur to be 0.1% or less in order to reduce gas generation. Alternatively, it is desirable to form a coated layer on the surface of at least the rotating shaft portion 22 with another material, such as electroless nickel plating, etc., in order to suppress gas generation. Further, the surface hardness can be improved by performing such a surface treatment. Because a lubricant-injected portion is formed as a fluid dynamic bearing in the rotating body 200 according to the present embodiment, the rotating body 200 is requested to have a high surface hardness and a small surface roughness. With respect to this point, the rotating body 200 according to the embodiment is suitable for practical use in terms of the rotating shaft portion 22 being formed of stainless steel having a high hardness and in terms of the surface hardness being improved by forming a coated layer on the surface thereof.

By forming the rotating body 200 with the rotating shaft portion 22, which is composed of the cylindrical portion 22a and the protruding portion 22b, and the hub 20, as stated above, the stiffness of the rotating body 200 and the squareness of the connection part can be maintained, thereby allowing the thinning in the axial direction of the rotating shaft to be easily achieved while stable rotational performance is being maintained.

Figure 6:
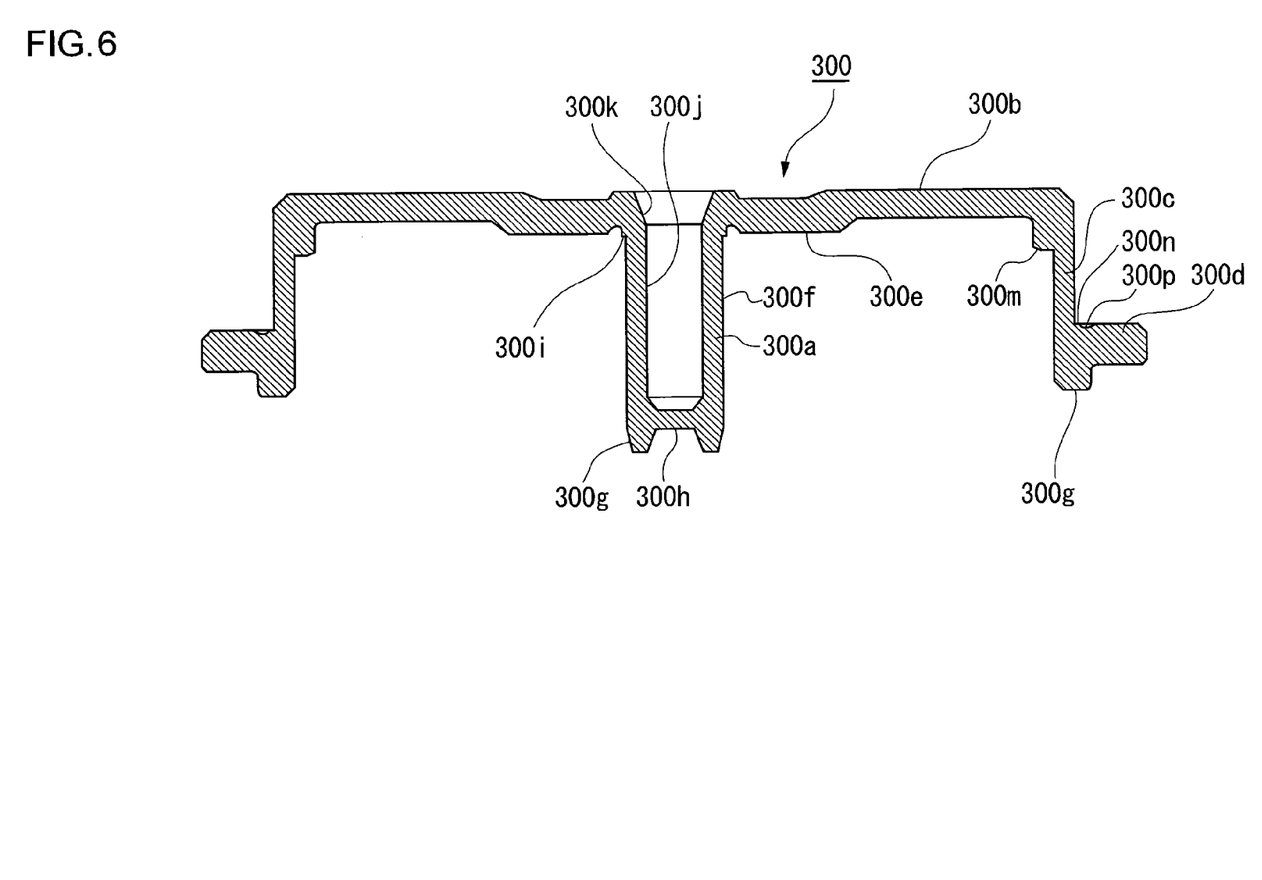
FIG. 6 is a sectional view of another structure of the rotating body for a fluid dynamic bearing according to the embodiment.

FIG. 6 is a sectional view explaining an example of another structure of the rotating body. In the structure of FIG. 6, the rotating shaft portion 22 and the hub 20 in FIG. 5 are formed integrally with each other. That is, a rotating body 300 is composed of a cylindrical portion 300a, a protruding portion 300b, an annular portion 300c, and a mounting seat portion 300d, which are integrated with each other. In other words, in the rotating body 300, the connection portion 20e that is to be connected to the end portion near to the outer circumference of the protruding portion 22b, the annular portion 20b that is connected to the connection portion 20e and extended in the axial direction of the cylindrical portion 22a (rotating shaft portion), and the mounting seat portion 20c that is formed in part of the annular portion 20b and extended radially outward, which are all illustrated in FIG. 5, are formed integrally with each other.

At least the cylindrical portion 300a and the protruding portion 300b are formed integrally with each other by a press process. In this case, the annular portion 300c and the mounting seat portion 300d may be formed by a cutting process or be simultaneously formed by the press process. The possibility that burrs and cutting chips, which are generated by a cutting process, may remain is reduced by increasing an area formed by a press process, which is preferable in terms of quality. By grinding and polishing the lower surface 300e of the protruding portion 300b and the outer circumferential surface 300f of the cylindrical portion 300a, the squareness between the cylindrical portion 300a and the protruding portion 300b can be easily improved. The outer circumferential surface 300f is to be a housed portion to be housed in the sleeve 16. The squareness between them can be further easily secured by simultaneously polishing the lower surface 300e and the outer circumferential surface 300f. Herein, the expression of "simultaneously" may mean that they are processed by a grindstone capable of simultaneously polishing two surfaces or that they are continuously processed without releasing the chucking of the rotating body 300 at the polishing thereof.

In the present embodiment, the axial length of the connection between the cylindrical portion 300a and the protruding portion 300b is made to be, for example, 1.0 mm or shorter, and preferably 0.7 mm. Because the cylindrical portion 300a and the protruding portion 300b are formed integrally with each other, as stated above, the stiffness can be maintained and the squareness can be easily secured even if the axial length is shortened, and accordingly the axial shortening (thinning) of the whole rotating body 300 can be achieved. The outer circumferential surface of the annular portion 300c and the upper surface of the mounting seat portion 300d are subjected to a polishing process, taking into consideration that the recording disk 120 can be mounted at a right angle relative to the cylindrical portion 300a. In addition, the mounting seat portion 300d is formed such that the axial thickness thereof is larger than that of the protruding portion 300b. That is, the thickness in the axial direction of the rotating shaft of the protruding portion 300b is smaller than that of the mounting seat portion 300d. Because the thickness of the mounting seat portion 300d is not involved in the axial thickness of the rotating body 300, the thinning of the rotating body 300 can be achieved by making the thickness of the mounting seat portion 300d large, even when the stability of supporting the recording disk 120 is improved.

The lower end outer circumferential portion 300g of the cylindrical portion 300a according to the present embodiment is designed to be tapered off to a point. In addition, the lower end bottom 300h is made to have a concave shape. A liquid reservoir space for the lubricant 28 can be formed in the space surrounded by the sleeve 16 and the housing 14 by making the lower end of the cylindrical portion 300a have a tapered shape or a concave shape. As a result, improvement in the performance of storing the lubricant 28 can be achieved.

A ridge portion is formed in the connection part between the cylindrical portion 300a and the protruding portion 300b in the rotating body 300, in which the diameter of the cylindrical portion 300a is increased by radially protruding from the outer circumferential surface 300f of the cylindrical portion 300a that is a regular diameter portion of the cylindrical portion 300a. The ridge portion can be formed as a reference step portion 300i. The reference step portion 300i also functions in the same way as the reference step portion 22h described in FIG. 5, and can be used as a mark for indicating a measuring reference position used when the diameter of the cylindrical portion 300a is measured. By providing the reference step portion 300i, measurement reproducibility in random inspection or 100 percent inspection is guaranteed, thereby allowing measurement reliability to be improved.

When the cylindrical portion 300a of the rotating body 300 is formed by a press process, it is needed to form an insertion hole 300j of a press mold inside the cylindrical portion 300a. Further, a tapered portion 300k, the diameter of which is increased toward the upper side, is provided at the open end of the insertion hole 300j in order to easily pull the press mold from the insertion hole 300j. The insertion hole 300j and the tapered portion 300k function in the same way as the insertion hole 22i and the tapered portion 22j, which have been described in FIG. 5, so that similar effects are exhibited. In this case, a screw portion where a screw for fixing the clamp member is screwed is formed in at least part of the insertion hole 300j, which is an axial hole. That is, the insertion hole 300j has a function of fixing well the clamp member that stably supports the recording disk 120.

A pedestal portion 300m is formed in the connection part between the protruding portion 300b and the annular portion 300c. Also, in the connection part between the annular portion 300c and the mounting seat portion 300d, a concave portion 300p that is axially concaved is formed such that a reference step portion 300n is formed in the connection part between the annular portion 300c and the mounting seat portion 300d. The pedestal portion 300m, the reference step portion 300n, and the concave portion 300p also function in the same way as the pedestal portion 20d, the reference step portion 20g, and the concave portion 20h, which have been described in FIG. 5, so that similar effects are exhibited. In addition, in the annular portion 300c according to the present embodiment, a protruding portion 300q is formed below the position where the mounting seat portion 300d is formed. The protruding portion 300q also exhibits same effects as the protruding portion 20i described in FIG. 5.

In the present embodiment, it is desirable to form the rotating body 300 with, for example, stainless steel having strong magnetism, for example, SUS 430. In this case, it is desirable to make the content of sulfur to be 0.1% or less in order to reduce gas generation. It is also desirable to form a coated layer on the surface of the rotating body 300 with another material, such as electroless nickel plating, etc., in order to suppress gas generation. Further, the surface hardness can be improved by performing such a surface treatment. Because a lubricant-injected portion is formed as a fluid dynamic bearing in the rotating body 300 according to the present embodiment, the rotating body 300 is requested to have a high surface hardness and a small surface roughness. With respect to this point, the rotating body 300 according to the embodiment is suitable for practical use in terms of the cylindrical portion 300a being formed of stainless steel having a high hardness and in terms of the surface hardness being improved by forming a coated layer on the surface thereof.

The rotating body 300 is produced through a press process, an adjustment process, and a surface coating process. In the press process, the cylindrical portion 300a, the protruding portion 300b, the annular portion 300c, and the mounting seat portion 300d are integrally press-processed. In the adjustment process, the processed dimensions and the squareness of the press-processed cylindrical portion 300a, protruding portion 300b, annular portion 300c, and mounting seat portion 300d are adjusted by a grinding process or a polishing process. In the surface coating process, the whole rotating body 300 including each portion, the processed dimension, etc., of which has been adjusted, is subjected to electroless nickel plating, etc., so that gas generation is suppressed and the surface hardness is improved.

By integrally forming the cylindrical portion 300a, the protruding portion 300b, the annular portion 300c, and the mounting seat portion 300d of the rotating body 300, as stated above, the stiffness of the rotating body 300 and the squareness of the connection part can be maintained, thereby allowing the thinning in the axial direction of the rotating shaft to be easily achieved while stable rotational performance is being maintained.

Figure 7:
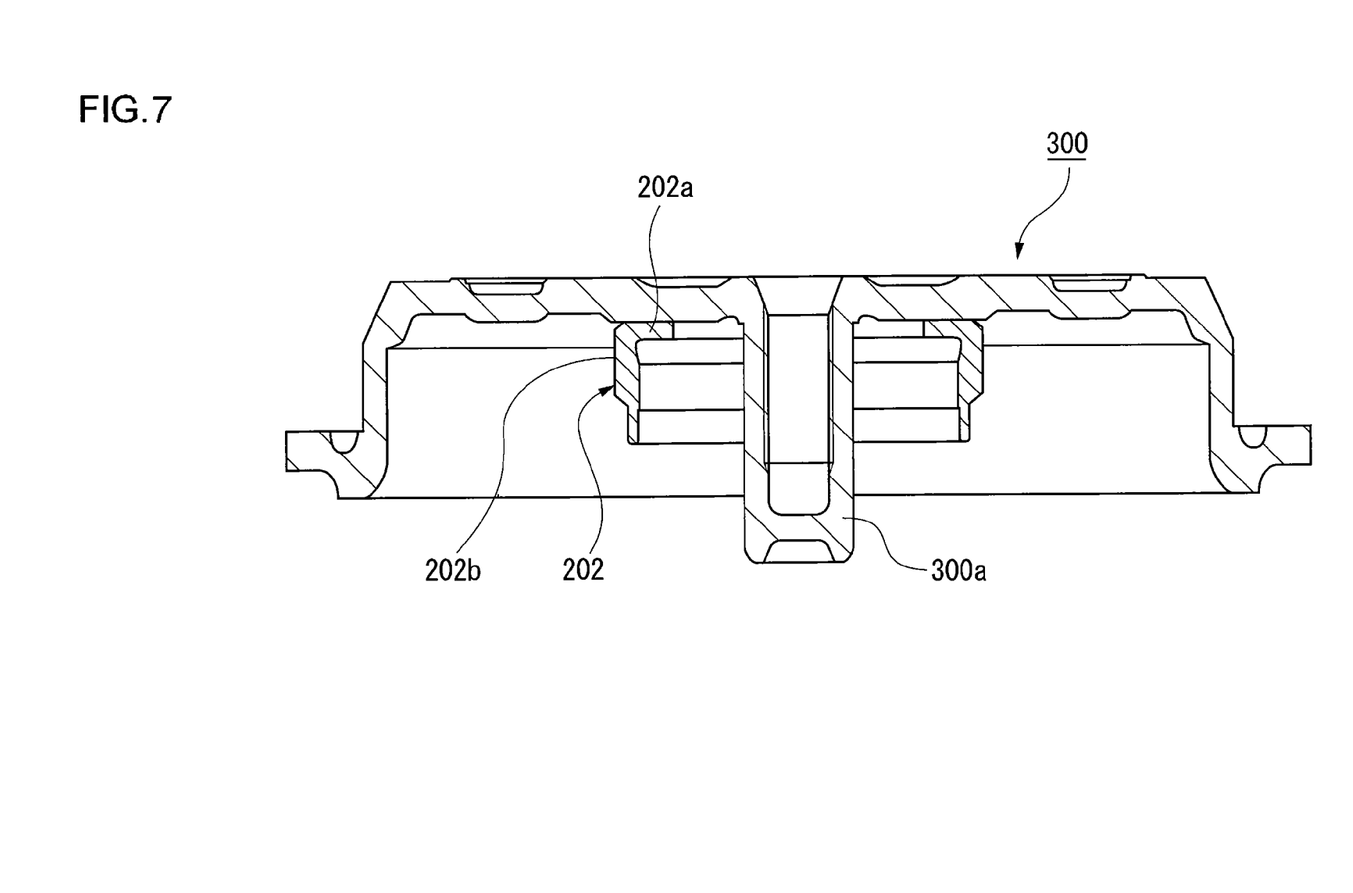
FIG. 7 is a sectional view explaining a state in which a fixing bracket has been connected to the rotating body for a fluid dynamic bearing according to the embodiment.
Figure 8:
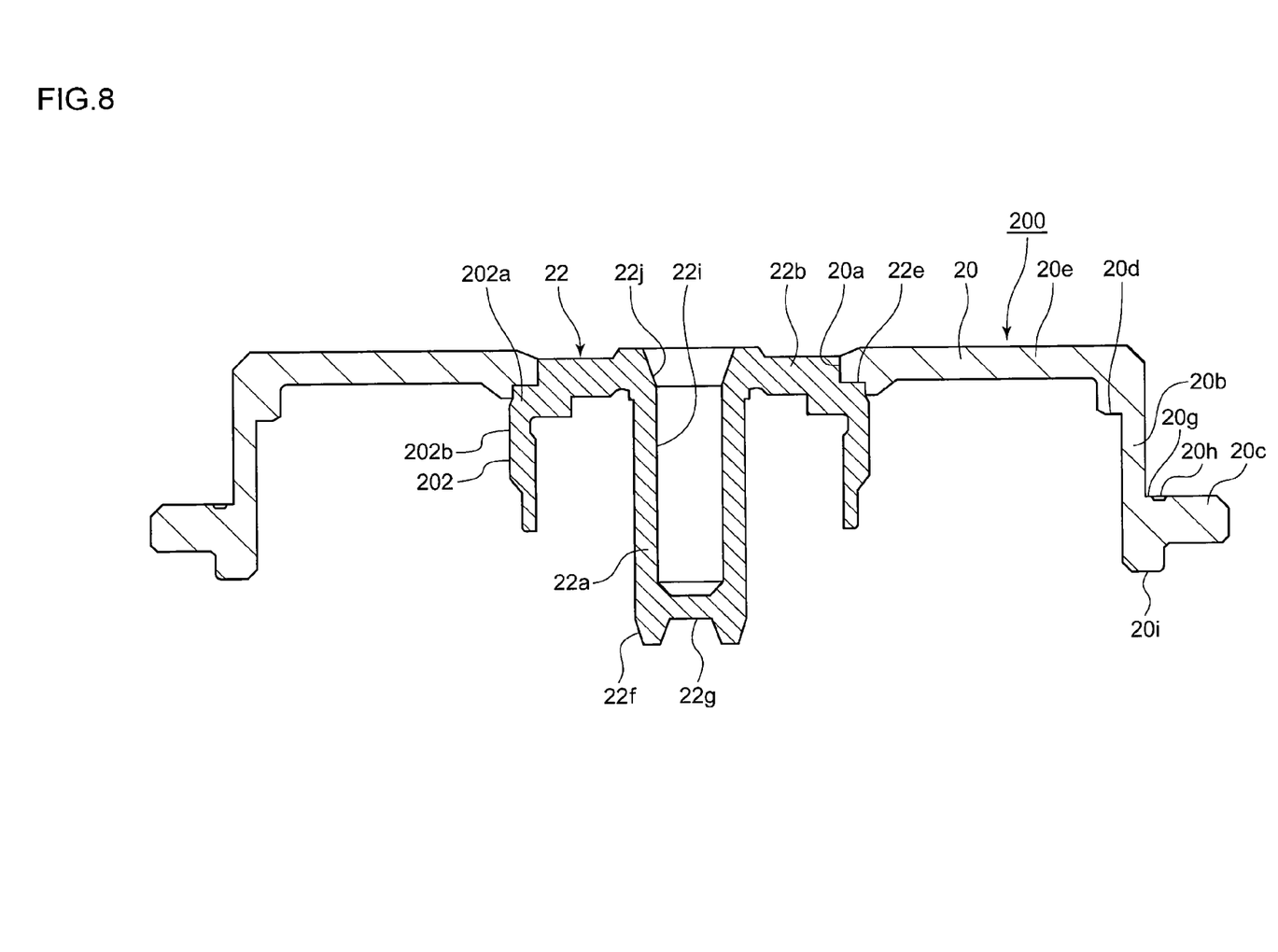
FIG. 8 is a sectional view explaining an example in which a protruding portion and a fixing bracket of the rotating body for a fluid dynamic bearing according to the embodiment have been formed integrally with each other.

FIG. 7 is a sectional view explaining a state in which the fixing bracket 202 has been connected to the rotating body 300 in FIG. 6. The fixing bracket 202 is composed of a bottom 202a to be connected to the lower surface 300e of the protruding portion 300b and a hanging portion 202b extending downward from the end portion of the bottom 202a. The thrust member 26 is joined to the inner circumferential surface of the hanging portion 202b. It is desirable to form the fixing bracket 202 with a material similar to that of the rotating body 300, for example, with stainless steel (e.g., SUS 303), etc., in terms of high antirust property. The fixing bracket 202 can be formed by, for example, a cutting process or a press process. A cutting process, when adopted, is preferred in terms of dimensional accuracy being easily secured. Various methods can be adopted for joining the rotating body 300 and the fixing bracket 202. For example, adhesion is preferred in terms of easy work. Alternatively, welding is preferred in terms of the joint strength being easily secured. When the thickness of the bottom 202a of the fixing bracket 202 is large, the part of the cylindrical portion 300a to be housed in the sleeve 16 is shortened, and hence it is preferable to make the thickness thin within a range in which the strength of the fixing bracket 202 can be maintained. FIG. 8 is a sectional view explaining an example in which the protruding portion 22b in the rotating shaft portion 22 illustrated in FIG. 5 and the fixing bracket 202 have been formed integrally with each other. The shape and functions of the fixing bracket 202 are similar to the fixing bracket 202 described in FIG. 7. The fixing bracket 202 is formed simultaneously with the formation of the rotating shaft portion 22 by a press process or a cutting process. Accordingly, the joint strength of the fixing bracket 202 with the rotating body 200 can be improved, and hence the fixing strength and fixing accuracy of the thrust member 26 can be improved. As a result, it becomes easy to stably maintain a space necessary for the formation of the capillary seal portion TS, thereby allowing improvement in the functions of the capillary seal portion TS to be achieved.

The present embodiments have been described with respect to the cases of being mainly used in an HDD; however, the embodiments should not be limited thereto. For example, a brushless motor having the structure illustrated in FIG. 2 may be produced to be mounted in an optical disk recording/reproducing device, such as CD (Compact Disc) device and DVD (Digital Versatile Disc) device, etc.

The present invention has been described based on the preferred embodiments, which are only intended to illustrate the principle and applications of the invention, and it is needless to say that a variety of modifications and variations in arrangement may be made to the embodiments within the range not departing from the spirit of the invention specified in appended claims.

We claim:

1. A rotating body for a fluid dynamic bearing used for rotating a recording disk that has been mounted therein, comprising:
   a rotating shaft portion, in which a cylindrical portion is integrally formed with a protruding portion, which extends radially outward from one end of the cylindrical portion, a diameter of an outer circumference of the protruding portion being larger than a diameter of an outer circumference of the cylindrical portion, the cylindrical portion is housed inside a sleeve, and the outer circumference of the cylindrical portion forms a radial dynamic bearing together with an inner circumference of the sleeve; and
   a hub that is connected with the outer circumference of the protruding portion and that has a mounting seat portion on which the recording disk is to be mounted,
   wherein the diameter of the outer circumference of the protruding portion is one and half times or more larger than that of the cylindrical portion.

2. The rotating body for a fluid dynamic bearing according to claim 1, wherein the hub is integrally formed with a connection portion connected to the protruding portion, an annular portion that extends from the connection portion in the axial direction of the rotating shaft portion, and the mounting seat portion, which extends radially outward from the annular portion.

3. The rotating body for a fluid dynamic bearing according to claim 1, wherein
   an annular bracket, which extends radially downward so as to surround the cylindrical portion, is formed integrally with the protruding portion.

4. The rotating body for a fluid dynamic bearing according to claim 1, wherein at least the rotating shaft portion is formed by a press process.

5. The rotating body for a fluid dynamic bearing according to claim 1, further comprising:
   a ridge portion, which is formed on a part of the outer circumference of the cylindrical portion where the cylindrical portion meets the protruding portion, a diameter of an outer circumference of the ridge portion being larger than the diameter of the outer circumference of the cylindrical portion.

6. The rotating body for a fluid dynamic bearing according to claim 1, wherein the thickness in the axial direction of the rotating shaft portion of the protruding portion is smaller than that of the mounting seat portion.

7. The rotating body for a fluid dynamic bearing according to claim 1, wherein in the cylindrical portion, a concave portion that is concaved in the axial direction of the rotating shaft portion is formed on the end surface opposite to the end surface where the protruding portion has been connected, and wherein the concave portion is filled with lubricant.

8. The rotating body for a fluid dynamic bearing according to claim 1, wherein the cylindrical portion has a lower end portion opposite to the protruding portion, an outer circumference of the lower end portion forms a tapered shape which becomes increasingly smaller toward the end surface of the lower end portion.

9. The rotating body for a fluid dynamic bearing according to claim 1, wherein in the cylindrical portion, an axial hole having an opening on the end surface on the side where the protruding portion is provided is formed by a press process, and a screw portion is formed in at least part of the axial hole.

10. The rotating body for a fluid dynamic bearing according to claim 1, further comprising a step portion that is integrally formed with and extends radially outward from the protruding portion of the rotating shaft portion, wherein the hub is connected to the protruding portion by an axially overlapping connection with the step portion.

11. A bearing part for a fluid dynamic bearing used for rotating a recording disk, comprising:
    a shaft portion, in which a cylindrical portion is integrally formed with a protruding portion, which extends radially outward from one end of the cylindrical portion, a diameter of an outer circumference of the protruding portion being larger than a diameter of an outer circumference of the cylindrical portion, the cylindrical portion is housed inside a sleeve, and the outer circumference of the cylindrical portion forms a radial dynamic bearing together with an inner circumference of the sleeve; and
    an annular part that is connected with the outer circumference of the protruding portion
    wherein the diameter of the outer circumference of the protruding portion is one and half times or more larger than that of the cylindrical portion.

12. The bearing part for a fluid dynamic bearing according to claim 11, further comprising:
    a ridge portion, which is formed on a part of the outer circumference of the cylindrical portion where the cylindrical portion meets the protruding portion, a diameter of an outer circumference of the ridge portion being larger than the diameter of the outer circumference of the cylindrical portion.

13. The bearing part for a fluid dynamic bearing according to claim 11, wherein in the cylindrical portion, a concave portion that is concaved in the axial direction of the shaft portion is formed on the end surface opposite to the end surface where the protruding portion has been connected.

14. The bearing part for a fluid dynamic bearing according to claim 11, wherein the cylindrical portion has a lower end portion opposite to the protruding portion, an outer circumference of the lower end portion forms a tapered shape which becomes increasingly smaller toward the end surface of the lower end portion.

15. The bearing part for a fluid dynamic bearing according to claim 11, wherein in the cylindrical portion, an axial hole having an opening on the end surface on the side where the protruding portion is provided is formed by a press process, and a screw portion is formed in at least part of the axial hole.

* * * * *